United States Patent [19]

Critchlow

[11] 3,907,550

[45] Sept. 23, 1975

[54] METHOD OF MAKING SAME COMPOSITE BILLETS

[75] Inventor: Philip R. Critchlow, St. Bruno, Canada

[73] Assignee: Airco, Inc., Montvale, N.J.

[22] Filed: Mar. 19, 1973

[21] Appl. No.: 342,899

[52] U.S. Cl. ................. 75/65 ZM; 29/599; 164/51; 164/54; 164/68

[51] Int. Cl.² ............................................ C22B 9/02

[58] Field of Search ...... 75/65 ZM; 29/599; 164/51, 164/54, 68, 69

[56] References Cited

UNITED STATES PATENTS

| | | | |
|---|---|---|---|
| 3,109,963 | 11/1963 | Geballe | 29/599 X |
| 3,117,859 | 1/1964 | Chandrasekhar | 75/65 |
| 3,125,441 | 3/1964 | Lafferty et al. | 75/65 |
| 3,270,400 | 9/1966 | Saur | 29/599 |
| 3,317,286 | 5/1967 | Sorbo | 29/599 UX |
| 3,437,459 | 4/1969 | Williams | 29/599 X |
| 3,465,430 | 9/1969 | Barber et al. | 29/599 |
| 3,623,221 | 11/1971 | Morton et al. | 29/599 |
| 3,708,606 | 1/1973 | Shattes et al. | 29/599 X |
| 3,763,553 | 10/1973 | Barber et al. | 29/599 |

FOREIGN PATENTS OR APPLICATIONS

| | | | |
|---|---|---|---|
| 1,094,429 | 12/1967 | United Kingdom | 75/65 |

*Primary Examiner*—Allen B. Curtis
*Assistant Examiner*—Thomas A. Waltz
*Attorney, Agent, or Firm*—Larry R. Cassett; H. Hume Mathews; Edmund W. Bopp

[57] ABSTRACT

Composite billets that function as starting stock for superconducting wire are produced by immersing an assembly of rods of a superconductor alloy or rods of a metal which is capable of forming a superconductor into a molten bath of normal material, thereby encasing the assembly within normal material, allowing the molten bath to solidify and form a rough as-cast billet and thereafter zone-melting the billet so as to remove all vestiges of shrinkage cracks, surface imperfections and internal inhomogeneities.

9 Claims, 3 Drawing Figures

METHOD OF MAKING SAME COMPOSITE BILLETS

BACKGROUND OF THE INVENTION

1. Field of the Invention

This invention relates generally to billets composed of rods of a superconductor alloy or rods of a metal which is capable of forming a superconductor contained within a matrix of normal material and more specifically to composite billets composed of materials which are difficult to mechanically coreduce because of substantial differences in the mechanical properties and the melting points of the individual constituents.

2. Prior Art

In the production of small diameter superconductor wire from a composite billet composed of rods, filaments or the like of a superconductor alloy or a metal which is capable of forming a superconductor embedded in a matrix of normal material, various problems are encountered during processing. Depending upon the billet diameter, ultimate wire size and equipment capabilities, the billet may be extruded, swaged, cold-worked, hot-worked, or by any combination of these forms of working.

Materials that can be employed as a matrix include aluminum, lead, cadmium, tin, copper, indium and various bronzes. Two such bronzes are gallium-bronze and tin-bronze.

Materials that are frequently used as superconductor alloys in composite billets are alloys of niobium-titanium and niobium-zirconium. Materials which are capable of forming a superconductor by reacting with a component in the matrix are vanadium and niobium.

In order to satisfactorily co-reduce the materials contained within a composite billet, the constituent elements must adhere to each other. Adherence is best accomplished by forming a bond between the elements. Therefore, if the alloy materials forming the superconductor are bonded to the matrix both constituents can be co-reduced more easily during mechanical working and fine superconducting wire can be attained from a composite billet.

The problems associated with producing small diameter superconducting wire can be classified as fabrication problems and economic or cost problems.

To illustrate why fabrication problems are encountered, attention is directed to the following table which sets forth the melting points and tensile strengths of various materials employed in the assembly of composite billets.

| Matrix Materials | Melting Point °C | Tensile Strength Annealed State, PSI |
|---|---|---|
| Aluminum | 660 | 6,800 |
| Cadmium | 321 | 10,300 |
| Lead | 327 | 1,780 |
| Indium | 156 | — |
| Tin | 232 | 2,000 |
| Copper (OFHC) | 1083 | 32,000 |
| Superconductor Materials or Components | | |
| Niobium | 2415 | 50,000 |
| Titanium | 1820 | 78,700 |
| Zirconium | 1750 | 36,000 |
| Vanadium | 1735 | 70,000 |
| Nb:Ti | 2000 | 70–80,000 |
| Nb:Zr | — | — |

It is readily apparent that vast differences exist between the melting points and tensile strengths of the matrix materials and rod insert materials. Of all the matrix materials listed, copper has the highest melting point and tensile strength. Aside from the excellent electrical properties of copper, these physical properties explain why this element is commonly employed as matrix material in the assembly of composite billets.

It is well known that hot-extrusion will economically and rapidly achieve the greatest reduction in area. However, the difference in the melting points between the constituents used in a composite billet restrict the temperature at which such hot working may be performed. For example, if a tin matrix is employed, the extrusion temperature cannot exceed the melting point of tin, 232°C.

The difference in mechanical properties between the matrix and rod insert materials, as evidenced by their respective tensile strengths, results in two more problems. When a composite billet containing a soft matrix material and a substantially harder rod insert is cold-worked during mechanical working, the matrix work hardens more quickly than does the insert. This necessitates frequent intermediate annealing in order to restore sufficient ductility to satisfactorily reduce the billet to small diameter wire. Another problem encountered during mechanical working is wherein the soft matrix material may slide and pull away from the inserts. This can be prevented by forming an adherent bond between the billet constituents and controlling the amount of co-reduction.

Aluminum is a desirable matrix material because its density makes it suitable for applications where weight is a factor, such as rotating machinery. Furthermore, a high purity aluminum matrix has excellent thermal and electrical properties.

However, the use of aluminum as a matrix has been limited because another problem, peculiar to this element, arises. It is well known in the art that an oxide layer readily forms, even at room temperature, on the surface of aluminum. The layer is extremely tenacious and difficult to break down with a resulting poor bond being achieved between the matrix and rod inserts.

When Type II "hard" superconducting wire is to be made by heat treating the wire to form intermetallic compounds, such as $V_3Ga$ and $Nb_3Sn$, by combining an element in the matrix with the rod inserts it is desirable to utilize matrix material with a specific chemical composition. For example, if the desired intermetallic compound is $V_3Ga$, a bronze matrix containing about 15% gallium is used. However, in order to achieve satisfactory superconducting properties, it is essential that the gallium addition be uniformly distributed throughout the matrix, i.e. the matrix must be free from any segregation. Therefore, to produce different intermetallic compounds requires the maintenance of a large inventory of matrices with different percentages of alloy additions. Furthermore, homogeneity of this stock is questionable.

Accordingly, the present invention provides a novel method for producing composite billets with a homogenous composition consisting of matrix with a low melting point and tensile strength and rod inserts with a high melting point and tensile strength. The method comprises immersing rods of a superconductor alloy or of a metal which is capable of forming a superconductor into a molten bath of matrix material, thereby encasing the rods, allowing the molten bath to solidify and form a rough as-cast billet and zone-melting the billet, thereby removing all surface imperfections, voids and shrinkage cracks.

SUMMARY OF THE INVENTION

An object of this invention is to provide a method for producing composite billets which function as starting stock for superconducting wire composed of metallic rods encased by a matrix of normal material wherein the individual constitutents have substantially different mechanical properties and melting points.

Another object of this invention is to provide a method for producing composite billets wherein the metallic rods are bonded to the matrix material.

A further object of this invention is to provide a method whereby a matrix of any nominal composition can be readily prepared.

A further object of this invention is to provide a method for producing composite billets that are essentially homogenous.

An object of this invention is to produce a composite billet composed of an aluminum matrix which encases and is bonded to metallic rods.

Still a further object of this invention is to provide a composite billet, wherein the individual constituents have substantially different mechanical properties and melting points, which is capable of being reduced to very small diameter wire.

These and other objects are obtained by lowering a plurality of metallic rods suspended between carbon caps into a deep graphite crucible containing a molten bath of a normal material, allowing the molten material to solidify and removing the solidifed casting. The casting, containing voids, shrinkage cracks and other surface imperfections is placed in a second identical graphite crucible and the entire assembly vertically inserted into a heated induction coil and zone-melted. Zone-melting removes all voids, surface imperfections and homogenizes the casting. The resulting composite billet has a smooth exterior surface, a uniform composition and is ready for further processing.

BRIEF DESCRIPTION OF THE SEVERAL VIEWS

DETAILED DESCRIPTION OF THE PREFERRED EMBODIMENT

Figure 1:
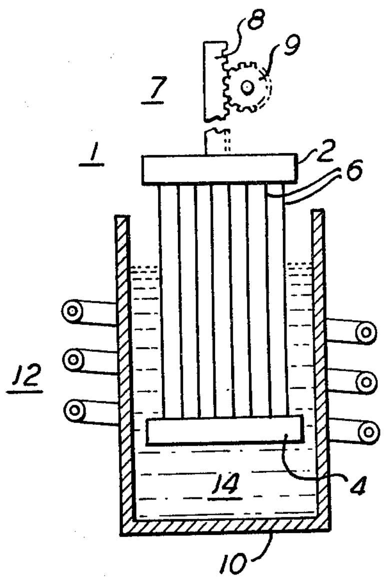
FIG. 1 is an elevation view showing metallic rods being immersed in a molten bath of normal material.
Figure 2:
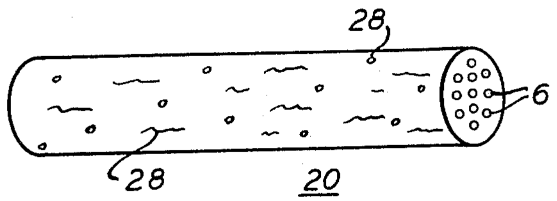
FIG. 2 is a diagrammatic longitudinal view of a cast billet.

Referring to FIG. 1, there is shown an assembly 1 being lowered into a graphite crucible 10. The assembly consists of a pair of graphite caps 2 and 4 and a support and lowering means 7. The caps contain internal bores (not shown) for receiving metallic rods 6. The rods are composed of a superconductor alloy such as Nb:Ti or Nb:Zr or of a metal which is capable of forming a superconductor, such as vanadium or niobium, by combining with an element in the matrix as hereinafter more fully described. The rods are suspended between the caps and lowered into the crucible 10 by means of the interengagement of rack 8 and pinion gear 9. Crucible 10 contains a molten bath 14 of a normal material. The composition of the bath depends upon the type of normal material which will constitute the composite billet matrix. For example, if a gallium-bronze or a tin-bronze matrix is desired, specific amounts of gallium or tin are carefully weighed and mixed with copper in order to obtain a resulting matrix with the proper chemical compostion. The bath is maintained in a molten state by induction coil 12. After the molten bath has been allowed to solidify and encase the rods, a cast billet 20 is formed. After the billet has cooled it is removed from the crucible. FIG. 2 shows cast billet 20 after removal from crucible 10. When end caps 2 and 4 are removed, metallic rods 6 are visible. The outer periphery of the billet contains numerous shrinkage cracks and other surface imperfections 28 which are characteristic of any casting.

Aside from surface defects, the cast billet contains internal voids and will also not be chemically homogeneous because of segregation. Lack of homogeneity will present two problems. Firstly, breakage during processing to extremely small diameter wire can occur and secondly, if the superconducting material is to be an intermetallic compound formed by reacting the rod insert with an element of the matrix, formation of the intermetallic compound can be impaired. This is due to the uneven distribution of the reactive element within the matrix resulting from segregation during cooling.

Figure 3:
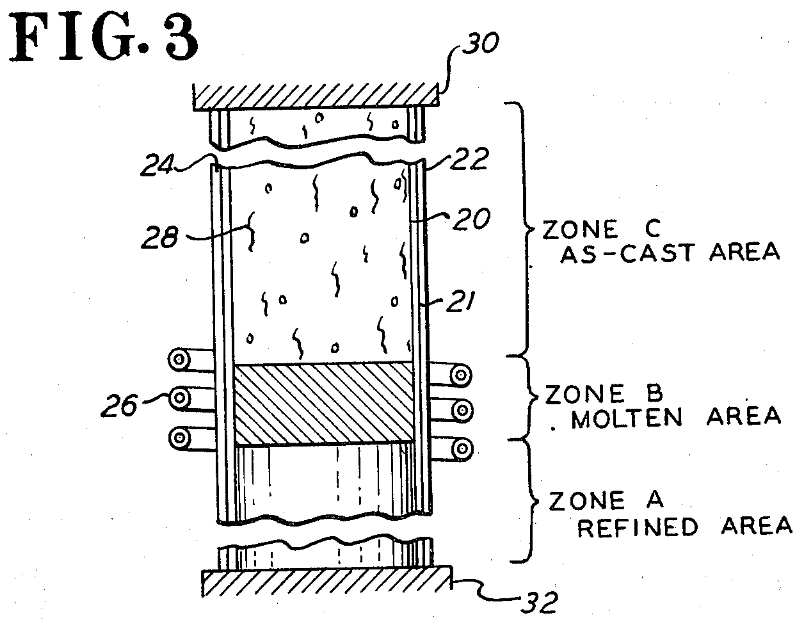
FIG. 3 is an elevation view showing a cast billet being zone-melted.

FIG. 3 illustrates billet 20 being zone-melted. The billet is placed in a graphite crucible 21 and this assembly is positioned between upper support 30 and lower support 32. A quartz tube 22 surrounds the assembly and serves as a protective shield. The inside diameter of the tube and the diameter of the crucible are so dimensioned so as to provide an annular space 24. Argon gas is passed through this space thereby insuring that zone-melting is conducted in a protective atmosphere. An induction heating coil 26 is disposed about the quartz tube and energized with an electrical current density of such a magnitude that the induced amperage produces a molten zone B in the billet. This invention, however, is not limited to this form of heating. For example, other forms of heating that produce a satisfactory zone-melted billet are resistance heating, conduction heating, electrical discharge heating and radiation heating.

Induction heating is employed herein because it is ideally suited for metals and, furthermore, there is no contamination of the zone-melted billet. During zone-melting, billet 20 comprises three distinct zones, zones A, B and C. Zone A represents a melted refined area, zone B represents a molten area being refined and zone C represents an unmelted to be refined as-cast area. Initially billet 20 is composed entirely of zone C. As the billet traverses vertically downwardly and passes through heating coil 26, as-cast zone C melts and becomes molten and is transformed into zone B. As the billet continues its downward traverse, zone B solidifies, thereby becoming zone A. As zone B gradually moves downwardly, zone A increases in size whereas zone C decreases in size until billet 20 can be considered to consist entirely of zone A.

During zone melting, billet 20 undergoes various changes. Shrinkage cracks, voids and all vestiges of surface imperfections are removed and an essentially homogeneous billet with a smooth exterior surface is obtained. Furthermore, the matrix material wets the metallic rod inserts 6, thereby forming a bond upon solidification.

In the production of fine superconducting wire, frequently less than 20 mils in diameter, a composite billet will undergo a reduction in area exceeding 99%. In order to accomplish this substantial reduction in area the billet, used as starting stock, must have a smooth defect-free surface and a homogeneous structure. Furthermore, in order to insure coreduction of the composite constituents there must be a satisfactory bond formed between the matrix and metallic rod inserts.

These desirable and essential characteristics are achieved in composite billets produced by this invention. As hereinbefore described, a homogenous billet exhibiting a smooth defect-free surface is attained. Bonding between the composite constituents is achieved by the wetting action of the molten matrix material on the suspended metallic rod inserts.

The practice of this invention can be easily understood by reference to the following specific examples.

EXAMPLE I

A composite billet containing niobium:titanium rods encased in an aluminum matrix was prepared in the following manner:

a. An assembly consisting of 19, 0.058 inches × 10 inches niobium: titanium rods was formed by suspending the rods between two pre-drilled graphite spacer caps.

b. The assembly was lowered into a graphite crucible containing molten aluminum. A temperature of 700°C was maintained by surrounding the crucible with a high frequency induction coil. The aluminum was then permitted to solidify and encase the rods, thereby forming a cast billet. The purity level of the aluminum bath can be varied depending upon the properties desired in the matrix. If electrical conductivity is the desired characteristic, a matrix with a high purity level will be provided, however, if the matrix must have a high strength level alloy additions will be made with a resulting sacrifice in purity.

c. The cast billet was placed inside a quartz tube containing an argon atmosphere and zone-melted at a temperature above the melting point of aluminum by moving the billet vertically downwards through an induction coil. The billet was moved at a rate of travel so as to maintain approximately a one inch molten zone. Furthermore, the cast billet was maintained in a strain-free condition so that the filaments remain in position.

The aluminum is adherently bonded to the niobium: titanium rods because the heretofore objectionable oxide layer did not form and zone-melting thoroughly wet the rod surfaces with molten aluminum.

EXAMPLE II

Another example of a composite billet is one that contains a metallic rod insert encased in an alloy matrix wherein the alloying element is capable of combining with the insert to form an intermetallic superconducting compound. A billet of this type was produced as follows:

a. An assembly consisting of 19, 0.058 inches × 12 inches vanadium rod inserts was formed by suspending the rods between two pre-drilled graphite spacer caps.

b. The assembly was lowered into a graphite crucible containing a molten gallium-bronze bath. The bath was prepared by mixing copper and gallium powders so as to arrive at a composition containing about 15 percent by weight of gallium. A temperature in the range of 1000°–1100°C was maintained by surrounding the crucible with a high frequency induction coil. The gallium-bronze was permitted to solidify and encase the rods, thereby forming a cast billet approximately 1½ inches in diameter by 12 inches in length.

c. The cast billet was then placed inside a quartz tube containing an argon atmosphere and zone-melted by moving the billet vertically downwards through an induction coil. Power input level and rate of ascent was carefully controlled so as to maintain approximately a one inch molten zone. The cast billet was maintained in a strain-free condition as hereinbefore described.

EXAMPLE III

A variation of the composite billet illustrated in Example II was produced in the following manner:

a. 24, ½ inches long × 1½ inches diameter gallium-bronze segments were assembled. The segments contained 19 equally distributed holes for receiving 19, 0.058 inches × 12 inches vanadium rod inserts. The rods were inserted into the segments and graphite spacers also containing a like number of holes were placed on each end of the assembly.

b. The assembly was placed into a quartz tube containing an argon atmosphere. A solid homogeneous billet was obtained by zone-melting the segments together.

While various embodiments of this invention have been described, it is to be understood that the embodiments so described are not intended to limit the invention except within the scope of the hereinafter appended claims.

I claim:

1. A method for producing composite billets to be used as starting stock for superconducting wire comprising the steps:

a. suspending metallic rods of material classified as or forming one component of a superconducting material between inert caps so as to form an assembly;
b. lowering said assembly into a molten bath of normal material so as to totally encase said rods;
c. allowing said bath to solidify thereby forming a cast composite billet; and
d. zone-melting said billet in an inert atmosphere by progressively heating the billet along its length until the entire billet is progressively remelted in segments to a maximum temperature exceeding the melting temperature of said normal material at which wetting takes place between said normal material and said rods, thereby providing a cast billet with improved adherence between said rods and said normal material.

2. A method as recited in claim 1 wherein step (a) further comprises selecting metallic rods from the group consisting of niobium, vanadium, niobium:titanium alloy and niobium:zirconium alloy.

3. A method as recited in claim 1 wherein step (b) further comprises selecting a normal material from the group consisting of aluminum, cadmium, lead, indium, tin, copper, gallium-bronze or tin-bronze.

4. A method for producing composite billets to be used as starting stock for superconducting wire wherein the composite constituents have substantial differences in melting points and mechanical properties comprising the steps:

a. forming an assembly by suspending metallic rods of a material selected from the group consisting of niobium, vanadium, niobium : titanium alloy and niobium : zirconium alloy between inert caps;

b. immersing said assembly into a molten metallic bath of normal material so as to totally encase said rods, said normal material being selected from the group consisting of aluminum, cadmium, lead, indium, tin, copper, gallium-bronze, or tin-bronze;

c. allowing said bath to solidify thereby forming a cast composite billet; and d. passing said billet in an inert atmosphere through an induction coil which progressively heats said billet along its length until the entire billet is progressively remelted in segments to a maximum temperature exceeding the melting temperature of said normal material at which wetting takes place between said normal material and said metallic rods thereby providing a cast billet with improved adherence between said metallic rods and said normal material.

5. A method as recited in claim 4 wherein steps (a) and (b) further comprise forming an assembly of niobium:titanium rods and immersing said rods into a bath of molten aluminum.

6. A method as recited in claim 5 further comprising passing said billet vertically through a heated induction coil, said coil being maintained at a temperature above the melting point of aluminum so as to remelt the billet in segments until the entire billet is remelted after passage through said coil.

7. A method as recited in claim 4 wherein steps (a) and (b) further comprise forming an assembly of vanadium rods and immersing said rods into a bath of molten gallium-bronze.

8. A method as recited in claim 7 futher comprising passing said billet vertically through a heated induction coil, said coil being maintained at a temperature above the melting point of gallium-bronze so as to remelt the billet in segments until the entire billet is remelted after passage through said coil.

9. The method as recited in claim 1, steps (a) and (b) wherein said metallic rods comprise one component of a superconducting material, and said molten metallic bath comprises a reactant forming a superconducting material with the material of said rod.

* * * * *